No. 687,121. Patented Nov. 19, 1901.
E. F. CALLENDER.
ELECTRIC BATTERY.
(Application filed Apr. 17, 1901.)
(No Model.)
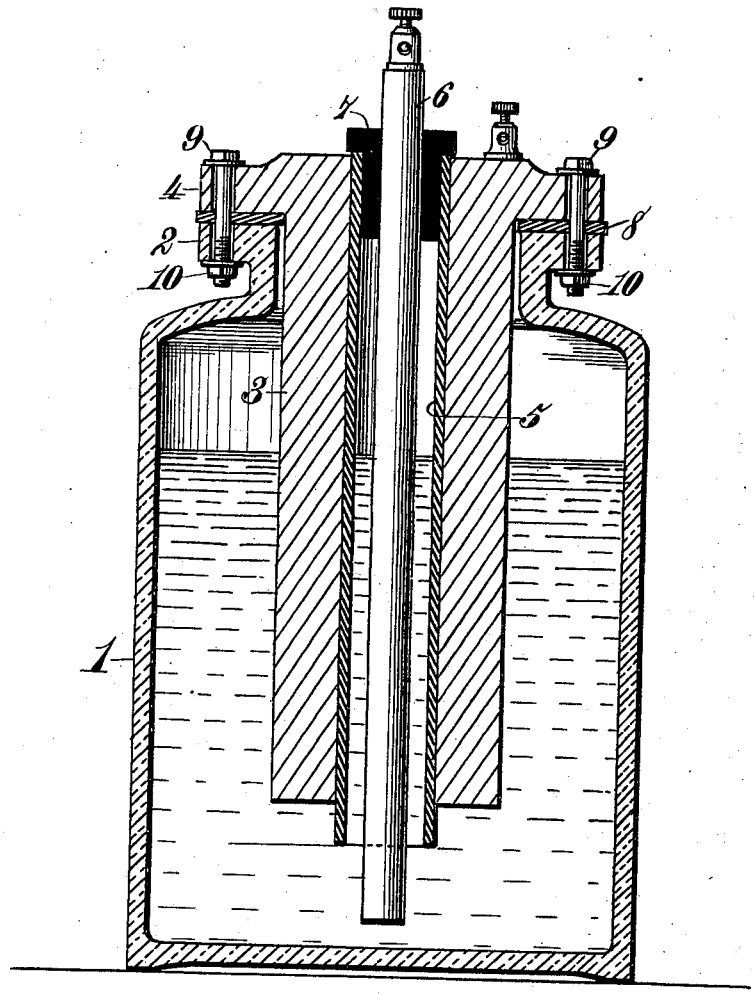
Witnesses.
Robert Everett.
Inventor.
Edwin F. Callender.
By James L. Norris.
Atty.

UNITED STATES PATENT OFFICE.

EDWIN F. CALLENDER, OF GALESBURG, ILLINOIS, ASSIGNOR OF ONE-HALF TO JAMES J. CALLENDER, OF GALESBURG, ILLINOIS.

ELECTRIC BATTERY.

SPECIFICATION forming part of Letters Patent No. 687,121, dated November 19, 1901.

Application filed April 17, 1901. Serial No. 56,257. (No model.)

*To all whom it may concern:*

Be it known that I, EDWIN F. CALLENDER, a citizen of the United States, residing at Galesburg, in the county of Knox and State of Illinois, have invented new and useful Improvements in Electric Batteries, of which the following is a specification.

This invention relates to electric batteries, and especially to that class of primary batteries employing carbon and zinc elements and a liquid electrolyte or exciting agent; and it has for its object to provide an improved battery of the type referred to in which the cell will be closed absolutely liquid and air tight, which will not short-circuit, which may be readily recharged, in which no internal action will take place when the battery is not in use, and which will be portable and can be made and sold at a small cost.

To these ends my invention consists in the features and in the construction, combination, and arrangement of parts hereinafter described, and particularly pointed out in the claim following the description, reference being had to the accompanying drawing, forming a part of this specification, wherein is illustrated a vertical sectional view of a cell constructed in accordance with my invention.

Referring to the drawing, the numeral 1 indicates a jar, cup, or cell formed of any suitable non-conducting material ordinarily employed for such purpose, and is provided at the upper end of its neck or mouth with a continuous laterally-projecting flange 2. Adapted to be suspended in the jar is the carbon element consisting of a hollow cylinder 3, of carbon, provided at its upper end with a collar or flange 4, which is adapted to rest over the flange 2 of the jar. The carbon cylinder and its flange or collar 4 are molded in one integral piece, and said carbon element is provided with a longitudinal bore centrally from end to end, as shown. Fitted within the bore of the carbon element and extending throughout its entire length is an insulating-lining consisting of a tube 5, of hard rubber, which closely fits the bore and is cemented liquid and air tight therein by any cement suitable for the purpose. Disposed centrally within the insulating-tube 5 is the zinc element consisting of a rod or pencil 6, of zinc, such as ordinarily used in batteries of the class to which this invention relates. As clearly shown in the drawing, the carbon element terminates at a point above the bottom of the jar and the insulating-tube extends from the top to the bottom of the carbon element, while the zinc-rod extends both above and below both the carbon and the insulating-tube. The zinc-rod preferably does not extend quite to the bottom of the jar and is held suspended centrally in the insulating-tube by a bushing 7, of relatively soft rubber, that is compressed between the upper end of the insulating-tube and the zinc-rod and laps over the upper end of the said tube. The rubber bushing not only serves to suspend the zinc-rod in place, but also serves to hermetically seal the cell at this point.

Disposed between the flanges 2 and 4 of the jar and carbon element, respectively, is an annulus 8, of rubber or equivalent material, and passing through said flanges and annulus are two or more headed bolts or screws 9, on the lower threaded ends of which are arranged nuts 10. By screwing up the nuts the rubber annulus is tightly compressed between the flanges 2 and 4 and effectually seals the cell at this point air and liquid tight.

By lining the bore of the hollow carbon with a hard-rubber tube in the manner described the zinc rod is prevented from either coming in contact with the carbon or in such close proximity thereto as would result in short-circuiting the battery. Moreover, the jar could be completely filled with electrolyte without forming a short-circuit, and any internal action of the battery when the latter is not in use is rendered impossible. By sealing the top of the cell in the manner shown and described it is rendered perfectly air and liquid tight, thus preventing the battery from "creeping" and permitting it to be moved or carried as freely as a dry cell without danger of spilling or splashing out any of the electrolyte. By removing the bolts the battery may be conveniently and readily recharged whenever it may become necessary.

I have shown the hard-rubber insulating-tube as being slightly longer than the bore of the carbon element; but it will be apparent that said tube may terminate at the bottom of the carbon. It will also be manifest that instead of making the jar, carbon, and zinc round or circular in cross-section, as shown, they may be made of any preferred shape.

As an exciting agent any liquid electrolyte may be employed.

I have described the lining-tube 5 as being of hard rubber; but it is obvious that it may be made of any insulating material suitable for the purpose, as porcelain or glass, for example, and the same remarks are equally applicable to the jar or cell. Furthermore, I have described the jar and zinc element as being sealed air and water tight, and by this I mean that they are sealed so as to prevent the spilling or splashing out of the electrolyte, it being immaterial whether air can or cannot effect an entrance through the sealed joints.

Having described my invention, what I claim is—

In a primary battery, the combination with a jar, of a hollow carbon element suspended therein, a tube of insulating material cemented in the bore of the carbon element and extending from end to end thereof, a zinc rod disposed within said tube and projecting at its lower end below the bottom of the carbon element, and a bushing fitted air and liquid tight in the upper end of said tube about the zinc rod, substantially as described.

In testimony whereof I have hereunto set my hand in presence of two subscribing witnesses.

EDWIN F. CALLENDER.

Witnesses:
JAMES J. CALLENDER,
GEO. R. DIMWALT.